US012712202B2

(12) United States Patent
Li et al.

(10) Patent No.: US 12,712,202 B2
(45) Date of Patent: Aug. 18, 2026

(54) LITHIUM SULFUR BATTERY

(71) Applicant: TOYOTA JIDOSHA KABUSHIKI KAISHA, Aichi-ken (JP)

(72) Inventors: Ximeng Li, Susono (JP); Sakina Kaneko, Susono (JP); Haruki Takagi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 607 days.

(21) Appl. No.: 18/211,039

(22) Filed: Jun. 16, 2023

(65) Prior Publication Data

US 2024/0047735 A1 Feb. 8, 2024

(30) Foreign Application Priority Data

Aug. 3, 2022 (JP) ................................ 2022-124252

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/008* (2013.01); *H01M 2300/0094* (2013.01)

(58) Field of Classification Search
CPC .... H01M 10/0562; H01M 4/38; H01M 4/382; H01M 4/5815; H01M 4/62
See application file for complete search history.

(56) References Cited

U.S. PATENT DOCUMENTS

| | | |
|---|---|---|
| 2016/0204466 A1 | 7/2016 | Nogami et al. |
| 2017/0338512 A1 | 11/2017 | Nogami et al. |
| 2020/0212498 A1 | 7/2020 | Kitamura et al. |
| 2020/0381776 A1 | 12/2020 | Mohtadi et al. |
| 2021/0234192 A1 | 7/2021 | Zheng et al. |
| 2021/0408590 A1 | 12/2021 | Kuwata et al. |

FOREIGN PATENT DOCUMENTS

| | | |
|---|---|---|
| JP | 2020-107525 A | 7/2020 |
| JP | 2020-194777 A | 12/2020 |
| JP | 2021-515353 A | 6/2021 |
| JP | 2022-011539 A | 1/2022 |
| WO | 2015/030053 A1 | 3/2015 |
| WO | 2016/103894 A1 | 6/2016 |

*Primary Examiner* — Sarah A. Slifka
(74) *Attorney, Agent, or Firm* — Sughrue Mion, PLLC

(57) ABSTRACT

The lithium sulfur battery of the present disclosure includes a positive electrode, a first electrolyte layer, a second electrolyte layer, and a negative electrode, wherein the first electrolyte layer is disposed between the positive electrode and the second electrolyte layer, and is in contact with the positive electrode, the second electrolyte layer is disposed between the first electrolyte layer and the negative electrode, the first electrolyte layer includes a hydride solid electrolyte, the hydride solid electrolyte includes a complex ion including Li cations and H, and the second electrolyte layer includes an electrolyte that differs from the hydride solid electrolyte.

7 Claims, 4 Drawing Sheets

LITHIUM SULFUR BATTERY

CROSS-REFERENCE TO RELATED APPLICATION

This application claims priority to Japanese Patent Application No. 2022-124252 filed on Aug. 3, 2022, incorporated herein by reference in its entirety.

BACKGROUND

1. Technical Field

The present application discloses a lithium sulfur battery.

2. Description of Related Art

Japanese Unexamined Patent Application Publication No. 2021-515353 (JP 2021-515353 A) discloses an all-solid-state lithium battery having a positive electrode, a sulfide solid electrolyte layer, a borohydride solid electrolyte layer, and a negative electrode in this order. Japanese Unexamined Patent Application Publication No. 2022-011539 (JP 2022-011539 A) discloses a method for producing a solid electrolyte layer using a slurry containing a borohydride compound and an alkane-based compound having five or six carbon atoms. Meanwhile, a lithium sulfur battery (LiS battery) is known as a battery having a high theoretical capacity.

SUMMARY

Although a conventional lithium sulfur battery can be expected to have a high capacity in theory, it is difficult to say that a sufficient capacity is obtained at present. There is room for improvement in the capacity of lithium sulfur batteries.

The present application discloses the following aspects as means for solving the above issue.

First Aspect

A lithium sulfur battery includes: a positive electrode; a first electrolyte layer including a hydride solid-electrolyte including a Li ion and a complex ion containing H; a second electrolyte layer including an electrolyte different from the hydride solid-electrolyte; and a negative electrode. The first electrolyte layer is disposed between the positive electrode and the second electrolyte layer, and is in contact with the positive electrode. The second electrolyte layer is disposed between the first electrolyte layer and the negative electrode.

Second Aspect

In the lithium sulfur battery according to the first aspect, the complex ion contains H, B, and C.

Third Aspect

In the lithium sulfur battery according to the first or second aspect, an area of a surface of the first electrolyte layer on the second electrolyte layer side is larger than an area of a surface of the positive electrode on the first electrolyte layer side.

Fourth Aspect

In the lithium sulfur battery according to any one of the first to third aspects, at least a portion of a side surface of the positive electrode is covered with the first electrolyte layer.

Fifth Aspect

In the lithium sulfur battery according to any one of the first to fourth aspects, the second electrolyte layer includes a sulfide-solid electrolyte.

Sixth Aspect

In the lithium sulfur battery according to the fifth aspect, the sulfide-solid electrolyte contains Li, P, S, and halogen.

The lithium sulfur battery of the present disclosure has a high capacity.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Lithium Sulfur Battery

Figure 1:
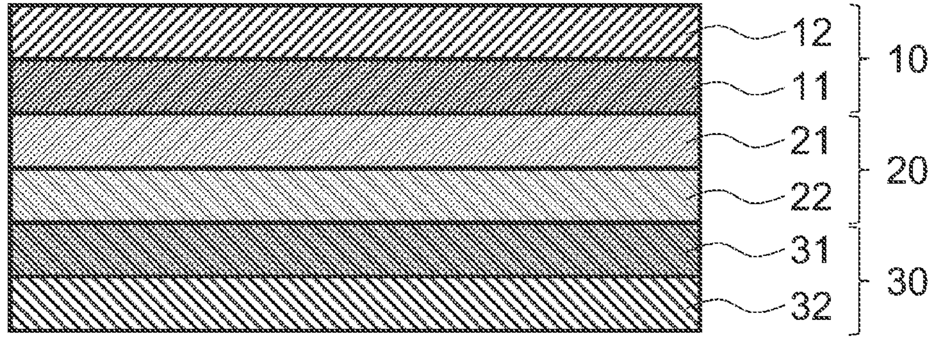
FIG. 1 schematically shows an example of a configuration of a lithium sulfur battery.

Hereinafter, a lithium sulfur battery of the present disclosure will be described with reference to the drawings. The lithium sulfur battery of the present disclosure is not limited to the illustrated form. FIG. 1 schematically illustrates a configuration of a lithium sulfur battery 100 according to an embodiment. The lithium sulfur battery 100 includes a positive electrode 10, a first electrolyte layer 21, a second electrolyte layer 22, and a negative electrode 30. The first electrolyte layer 21 is disposed between the positive electrode 10 and the second electrolyte layer 22 and is in contact with the positive electrode 10. The second electrolyte layer 22 is disposed between the first electrolyte layer 21 and the negative electrode 30. The first electrolyte layer 21 includes a hydride solid electrolyte, and the hydride solid electrolyte includes Li ions and complex ions including H. The second electrolyte layer 22 includes an electrolyte different from the hydride solid electrolyte.

1.1 Positive Electrode

The positive electrode 10 includes sulfur as a positive electrode active material. The positive electrode 10 may be any electrode that can appropriately function as a positive electrode of a lithium sulfur battery. The configuration is not particularly limited. As shown in FIG. 1, the positive electrode 10 may include a positive electrode active material layer 11 and a positive electrode current collector 12. In this case, the positive electrode active material layer 11 contains sulfur as a positive electrode active material.

1.1.1 Positive Electrode Active Material Layer

The positive electrode active material layer 11 contains at least sulfur as a positive electrode active material, and may optionally contain an electrolyte, a conductive auxiliary agent, a binder, and the like. The positive electrode active material layer 11 may further contain various additives. The content of each component in the positive electrode active material layer 11 may be appropriately determined according to the desired battery performance. For example, the content of the positive electrode active material may be 10% by mass or more, 20% by mass or more, 30% by mass or more, 40% by mass or more, 50% by mass or more, 60% by mass or more, or 70% by mass or more, assuming that the entire positive electrode active material layer 11 (the entire solid content) is 100% by mass. The content of the positive electrode active material may be 100% by mass or less or 90% by mass or less. The shape of the positive electrode active material layer 11 is not particularly limited. The shape of the positive electrode active material layer 11 may be, for example, a sheet-like positive electrode active material layer having a substantially flat surface. The thickness of the positive electrode active material layer 11 is not particularly limited. The thickness of the positive electrode active material layer 11 may be, for example, 0.1 μm or more, 1 μm or more, or 10 μm or more. The thickness of the positive electrode active material layers 11 may be 2 mm or less, 1 mm or less, or 500 μm or less.

As described above, at least sulfur is used as the positive electrode active material. Sulfur may function as a positive electrode active material. The sulfur may be elemental sulfur. The sulfur may be a sulfur compound. The positive electrode active material layer 11 may contain a positive electrode active material other than elemental sulfur or a sulfur compound. Examples of the positive electrode active material other than the elemental sulfur and the sulfur compound include various lithium-containing compounds. The lithium-containing compound may be a variety of lithium-containing oxides such as lithium cobaltate, lithium nickelate, $Li_{1\pm a}Ni_{1/3}Co_{1/3}Mn_{1/3}O_{2\pm\delta}$, lithium manganate, a spinel-based lithium compound (heterogeneous element replacement Li—Mn spinel represented by $Li_{1+x}Mn_{2-x-y}M_yO_4$ (M is one or more selected from Al, Mg, Co, Fe, Ni and Zn), lithium titanate, metallic lithium phosphate ($LiMPO_4$, and M is one or more selected from Fe, Mn, Co and Ni). Incidentally, as the proportion of sulfur in the entire positive electrode active material increases, expansion and contraction of the positive electrode at the time of charging and discharging tends to increase, and cracking of the electrolyte layer is concerned. On the other hand, in the lithium sulfur battery 100, as will be described later, a predetermined hydride solid electrolyte is contained in the first electrolyte layer 21, and cracking of the electrolyte layer is easily suppressed. In this regard, in the lithium sulfur battery 100, the ratio of the elemental sulfur and the sulfur compound to the entire positive electrode active material contained in the positive electrode active material layer 11 may be high. The percentages of monomeric sulfur and sulfur compounds contained in the positive electrode active material layer 11 may be specifically 50% or more 100% mass %, 60% or more to 100% mass %, 70% or more to 100 mass % or less, 80% or more to 100 mass % or less, or 90% or more to 100 mass % or less.

The shape of the positive electrode active material may be any general shape as the positive electrode active material of the lithium sulfur battery. The positive electrode active material may be in a particulate form, for example. The positive electrode active material may be a solid material, a hollow material, a void material, or a porous material. The positive electrode active material may be primary particles. The positive electrode active material may be a secondary particle in which a plurality of primary particles is aggregated. The mean particle diameter D50 of the positive electrode active material may be, for example, 1 nm or more, 5 nm or more, or 10 nm or more. The mean particle diameter D50 of the positive pole active material may be not more than 500 μm, not more than 100 μm, not more than 50 μm or less than 30 μm. The mean particle diameter D50 in the present application is the particle diameter (median diameter) at an integrated value of 50% in the volume-based particle size distribution determined by the laser diffraction/scattering method.

The electrolyte that may be included in the positive electrode active material layer 11 may be a solid electrolyte or a liquid electrolyte. The electrolyte that may be included in the positive electrode active material layer 11 may be a combination thereof. In particular, when the positive electrode active material layer 11 includes at least a solid electrolyte as an electrolyte, a higher effect is easily obtained.

As the solid electrolyte, one known as a solid electrolyte of a battery may be used. The solid electrolyte may be an inorganic solid electrolyte or an organic polymer electrolyte. In particular, the inorganic solid electrolyte has high ionic conductivity and excellent heat resistance. Examples of the inorganic solid electrolyte include lithium lanthanum zirconate, LiPON, $Li_{1+X}Al_XGe_{2-X}(PO_4)_3$, Li—SiO glasses, and oxide solid electrolytes such as Li—Al—S—O glasses. Sulfidesolid-state electrolytes such as $P_2S_5$, $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, $Li_2S$—$P_2S_5$—$GeS_2$. In particular, the performance of a sulfide solid electrolyte containing at least P and S as constituent elements among them is high. The solid electrolyte may be amorphous or may be crystalline. The solid electrolyte may be in the form of particles, for example. Only one type of solid electrolyte may be used alone, or two or more types may be used in combination.

The electrolyte may comprise lithium ions. The electrolytic solution may be, for example, a nonaqueous electrolytic solution. The composition of the electrolytic solution may be the same as that known as the composition of the electrolytic solution of the battery. For example, as the electrolytic solution, a solution obtained by dissolving a lithium salt in a carbonate-based solvent at a predetermined concentration can be used. Examples of the carbonate-based solvents include fluoroethylene carbonate (FEC), ethylene carbonate (EC), and dimethyl carbonate (DMC). Examples of the lithium-salt include $LiPF_6$.

Examples of the conductive auxiliary agent that can be included in the positive electrode active material layer 11 include carbon materials such as vapor-phase carbon fibers (VGCF), acetylene black (AB), Ketjen black (KB), carbon nanotubes (CNT), and carbon nanofibers (CNF); and metallic materials such as nickel, aluminum, and stainless steel. The conductive aid may be, for example, particulate or fibrous. The size is not particularly limited. Only one type of the conductive auxiliary agent may be used alone. Two or more kinds of the conductive auxiliary agents may be used in combination.

Examples of the binder that can be contained in the positive electrode active material layer 11 include a butadiene rubber (BR) binder, a butylene rubber (IIR) binder, an acrylate butadiene rubber (ABR) binder, a styrene butadiene rubber (SBR) binder, a polyvinylidene fluoride (PVdF) binder, a polytetrafluoroethylene (PTFE) binder, and a polyimide (PI) binder. Only one binder may be used alone. Two or more kinds of binders may be used in combination.

1.1.2 Positive Electrode Current Collector

As shown in FIG. 1, the positive electrode 10 may include a positive electrode current collector 12 in contact with the positive electrode active material layer 11. As the positive electrode current collector 12, any of common positive electrode current collectors of a lithium sulfur battery can be adopted. The positive electrode current collector 12 may be a foil, a plate, a mesh, a punching metal, a foam, or the like. The positive electrode current collector 12 may be formed of a metal foil or a metal mesh. In particular, the metal foil is excellent in handling properties and the like. The positive electrode current collector 12 may be formed of a plurality of foils. The positive electrode current collector 12 may be made of Cu, Ni, Cr, Au, Pt, Ag, Al, Fe, Ti, Zn, Co, steel or the like. In particular, from the viewpoint of ensuring oxidation resistance or the like, the positive electrode current collector 12 may contain Al. The positive electrode current collector 12 may have some coating layer on the surface thereof for the purpose of adjusting resistance or the like. The positive electrode current collector 12 may be formed by plating or depositing the metal on a metal foil or a base material. When the positive electrode current collector 12 is formed of a plurality of metal foils, the positive electrode current collector 12 may have some layer between the plurality of metal foils. The thickness of the positive electrode current collector 12 is not particularly limited. The thickness of the positive electrode current collector 12 may be, for example, 0.1 μm or more or 1 μm or more. The thickness of the positive electrode current collector 12 may be 1 mm or less, or 100 μm or less.

1.2 Electrolyte Layer

The lithium sulfur battery 100 includes at least a first electrolyte layer 21 and a second electrolyte layer 22 as the electrolyte layer 20. The electrolyte layer 20 is disposed between the positive electrode 10 and the negative electrode 30, and can function as a separator. The electrolyte layer 20 includes at least an electrolyte. The electrolyte layer may further optionally include a binder or the like.

1.2.1 First Electrolyte Layer

The first electrolyte layer 21 is disposed between the positive electrode 10 and the second electrolyte layer 22, and is in contact with the positive electrode 10. As described above, the positive electrode of the lithium sulfur battery contains sulfur as a positive electrode active material. Here, the volume change of sulfur due to charge and discharge is large. According to the present inventor's new knowledge, when the electrolyte layer in contact with the positive electrode is hard (for example, when the electrolyte layer in contact with the positive electrode is a sulfide solid electrolyte layer), cracking is likely to occur in the electrolyte layer due to expansion and contraction of sulfur caused by charging and discharging, and propagation of cracks is also likely to occur. When a crack occurs in the electrolyte layer, metal lithium grows from the negative electrode side to the positive electrode side through the crack, and a short circuit is likely to occur. As a result, the capacity that can be charged and discharged up to the short circuit is lowered. In contrast, the first electrolyte layer 21 is in contact with the positive electrode 10 and includes a predetermined hydride solid electrolyte. According to the findings of the present inventors, the hydride solid electrolyte has flexibility and good moldability. When the first electrolyte layer 21 containing the hydride solid electrolyte is disposed so as to be in contact with the positive electrode 10, it is considered that even when the sulfur contained in the positive electrode 10 expands and contracts with charging and discharging, the stress caused by the expansion and contraction is easily absorbed by the flexible hydride solid electrolyte contained in the first electrolyte layer 21, and cracks hardly occur in the electrolyte layer 20, and propagation of cracks hardly occurs. As a result, occurrence of a short circuit caused by cracking of the electrolyte layer 20 as described above is suppressed. Then, it is considered that the capacity capable of charging and discharging increases.

The hydride solid-electrolyte has Li ions and complex ions containing H. The complex ion containing H may be represented by $(M_mH_n)^{\alpha-})$. In this case, m is any positive number. n and α may be any positive numbers depending on m, the equivalent number of the element M, and the like. The element M may be a non-metal element or a metal element capable of forming a complex ion. Alternatively, the element M may include at least one of B, C and N as a non-metallic element, and may include B. Further, for example, the element M may include at least one of Al, Ni and Fe as the metallic element. In particular, when the complex ion includes H and B, or when the complex ion includes H, B and C, higher ion conductivity is easily ensured. Examples of complex ions containing H include: $(CB_9H_{10})^-$, $(CB_{11}H_{12})^-$, $(B_{10}H_{10})^{2-}$, $(B_{12}H_{12})^{2-}$, $(BH_4)^-$, $(NH_2)^-$, $(AlH_4)^-)$, and combinations thereof. In particular, when $(CB_9H_{10})^-$, $(CB_{11}H_{12})^-$, or a combination thereof is used, higher ionic conductivity is easily ensured.

Alternatively, the complex ion containing H may be, for example, at least one selected from the group consisting of (A) to (C) below.

(A) Borane having a total charge of −2 and having from 6 to 12 boron atoms (B) A carborane having a total charge of −1 and having one carbon and 5 to 11 boron (C) A carborane having a total charge of −1 or −2 and having 2 carbon atoms and 4 to 10 boron atoms When the complex ion containing H is borane or carborane as described above, part of H in the borane or carborane may be substituted or unsubstituted. For example, the complex ion containing H may be substituted with one or more H groups by at least one substituent selected from the group consisting of (X1) to (X3) below.

(X1) Halogen (X2) Organic substituent (X3) Combinations of halogen and organic substituents The complex ion containing H may be an anion represented by any one of formulae (I) to (V) below.

$$[B_yH_{(y-z-i)}R_zX_i]^{2-}$$ Expression (I):

$$[CB_{(y-1)}H_{(y-z-i)}R_zX_i]^{-}$$ Expression (II):

$$[C_2B_{(y-2)}H_{(y-t-j-1)}R_tX_j]^{-}$$ Expression (III):

$$[C_2B_{(y-3)}H_{(y-t-j)}R_tX_j]^{-}$$ Expression (IV):

$$[C_2B_{(y-3)}H_{(y-t-j-1)}R_tX_j]^{2-}$$ Expression (V):

Where y is an integer from 6 to 12. (z+i) is an integer from 0 to y. (t+j) is an integer from 0 to (y−1). X is F, Cl, Br, I, or a combination thereof. R in formulae (I) to (V) may be any organic substituent or hydrogen.

In formulae (I) to (V) above, when i is an integer from 2 to y, or when j is an integer from 2 to (y−1), a plurality of halogen-substituents is present in the complex ion. In such cases, the plurality of halogen-substituents can include F, Cl, Br, I, or any combination thereof. For example, in a complex ion having three halogen substituents (i.e., when i or j is 3), the three halogen substituents may be three fluorine substituents; one chlorine substituent, one bromine substituent, and one iodine substituent; or any other combination.

The complex ion comprising H may comprise either substituted or unsubstituted closo-boron cluster anions. For example, the complex ion containing H may be at least one selected from closo-$[B_6H_6]^{2-}$, closo-$[B_{12}H_{12}]^{2-}$, closo-$[CB_{11}H_{12}]^{-}$, or closo-$[C_2B_{10}H_{11}]^{-}$. Specific configurations of closo-boron cluster anions are disclosed, for example, in FIGS. 1A to 1C of Japanese Unexamined Patent Application Publication No. 2020-194777 (JP 2020-194777 A).

The content of the hydride solid electrolyte in the first electrolyte layer 21 is not particularly limited. The first electrolyte layer 21 may contain, for example, the above-mentioned hydrogenide solid electrolytes not less than 50% by mass and not more than 100% by mass, not more than 60% by mass and not more than 100% by mass, not more than 70% and not more than 100% by mass, not more than 80% and not more than 100% by mass, or not more than 90% and not more than 100% by mass.

The first electrolyte layer 21 may include an electrolyte other than the hydride solid electrolyte together with the hydride solid electrolyte. Examples of the electrolyte other than the hydride solid electrolyte include those exemplified as the electrolyte that can be included in the positive electrode active material layer 11 described above. However, as the proportion of the hydride solid electrolyte in the entire solid electrolyte included in the first electrolyte layer 21 is higher, the first electrolyte layer 21 can be easily softened. Further, it is considered that the effect of the technology of the present disclosure is enhanced. In this regard, the proportion of the hydride solid electrolyte in the entire solid electrolyte contained in the first electrolyte layer 21 may be 50% by mass or more and 100% by mass or less, 60% by mass or more and 100% by mass or less, 70% by mass or more and 100% by mass or less, 80% by mass or more and 100% by mass or less, 90% by mass or more and 100% by mass or less, or 95% by mass or more and 100% or less.

The binder that may be included in the first electrolyte layer 21 may be appropriately selected from those exemplified as the binder that may be included in the positive electrode active material layer 11. The binder included in the first electrolyte layer 21 and the binder included in the positive electrode active material layer 11 may be of the same type or may be of different types.

The shape of the first electrolyte layer 21 is not particularly limited as long as it is disposed between the positive electrode 10 and the second electrolyte layer 22 and can be in contact with the positive electrode 10. The shape of the first electrolyte layer 21 may be, for example, a sheet-like first electrolyte layer 21 having a substantially flat surface. The thickness of the first electrolyte layer 21 is not particularly limited. The thickness of the first electrolyte layer 21 may be, for example, 0.1 μm or more, 1 μm or more, or 10 μm or more. The thickness of the first electrolyte layers 21 may be 2 mm or less, 1 mm or less, or 500 μm or less.

Figure 2:
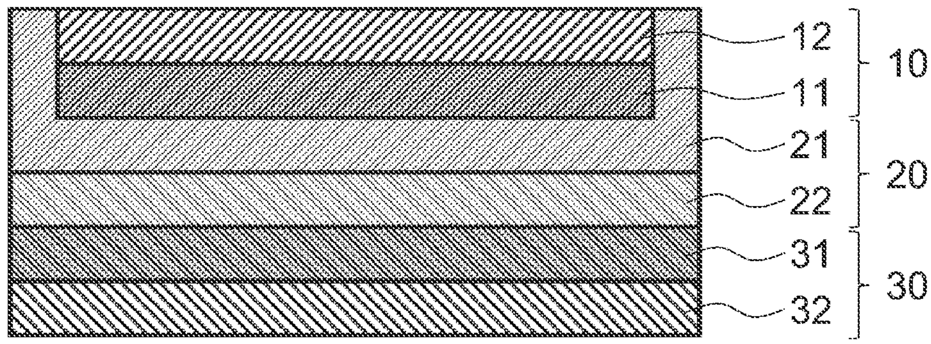
FIG. 2 schematically shows an example of a configuration of a lithium sulfur battery.
Figure 3A:
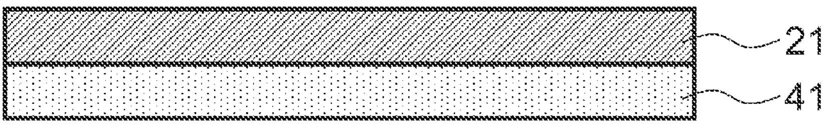
FIG. 3A schematically illustrates a configuration of a first transfer material obtained by one step of a process for producing a lithium sulfur battery.
Figure 3B:
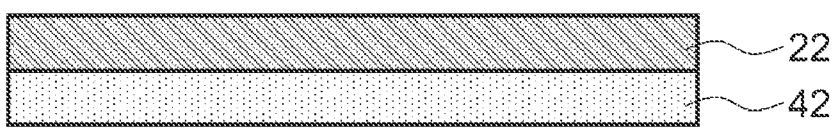
FIG. 3B schematically illustrates a configuration of a second transfer material obtained by one step of a process for producing a lithium sulfur battery.
Figure 3C:
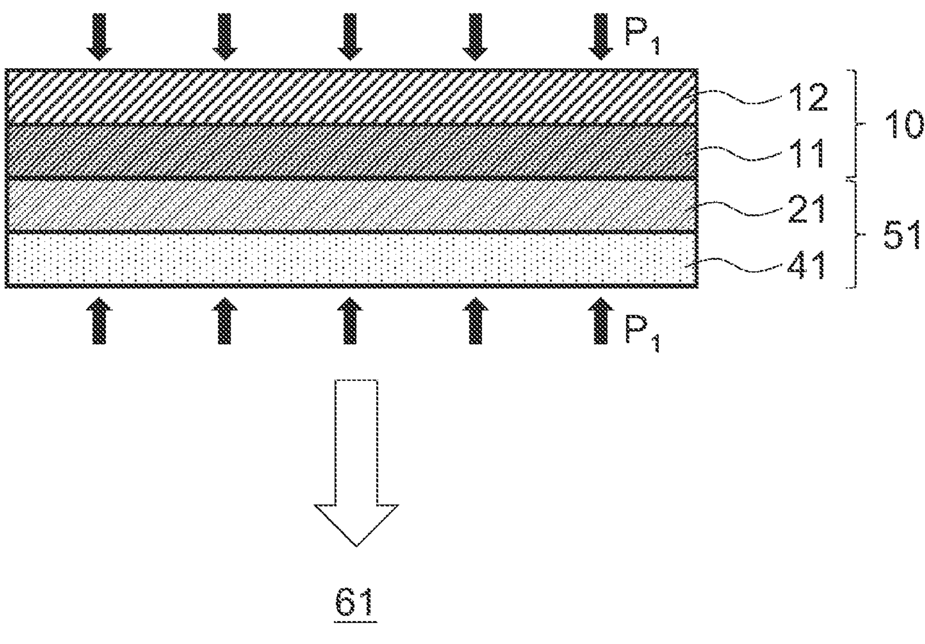
FIG. 3C schematically illustrates a process for producing a lithium sulfur battery.
Figure 3C:
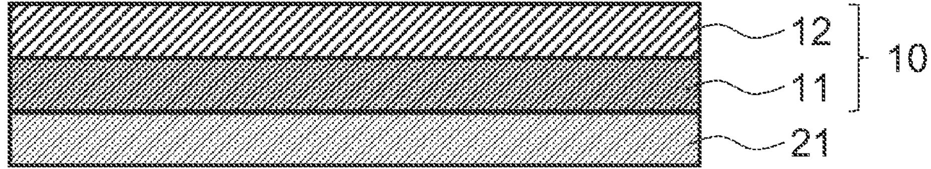
Figure 3D:
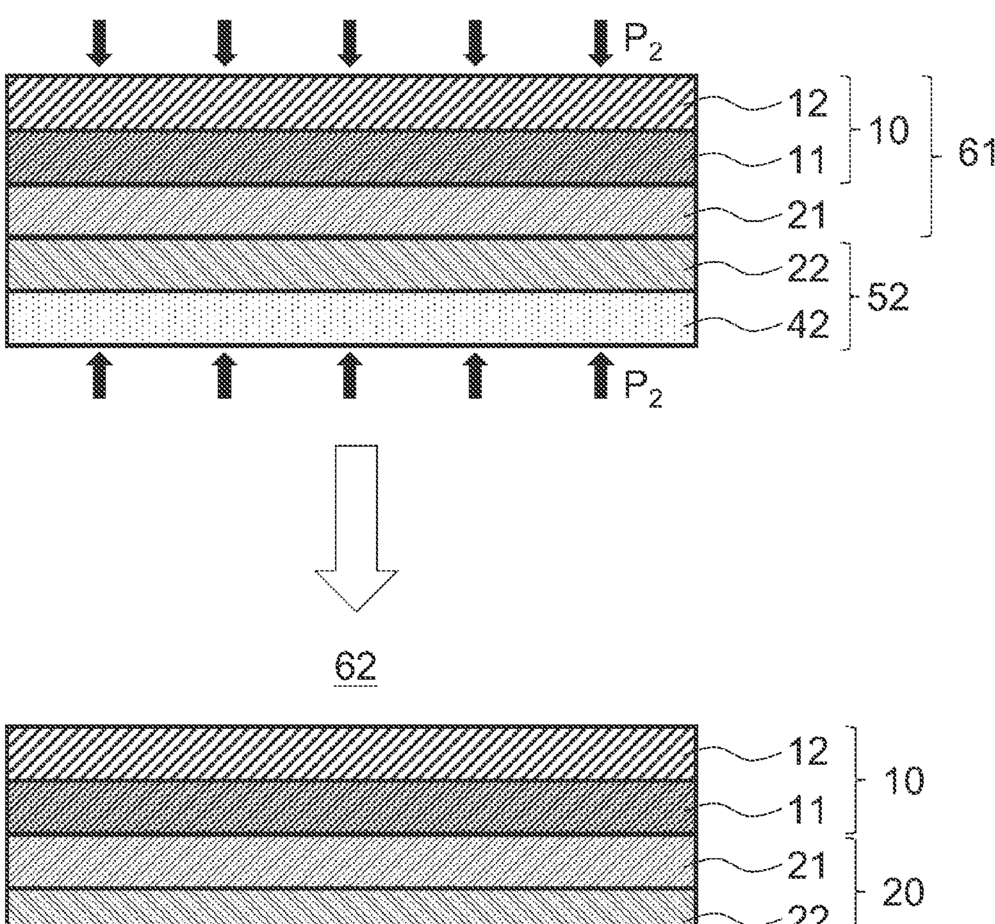
FIG. 3D schematically illustrates a process for the production of a lithium sulfur battery.
Figure 3E:
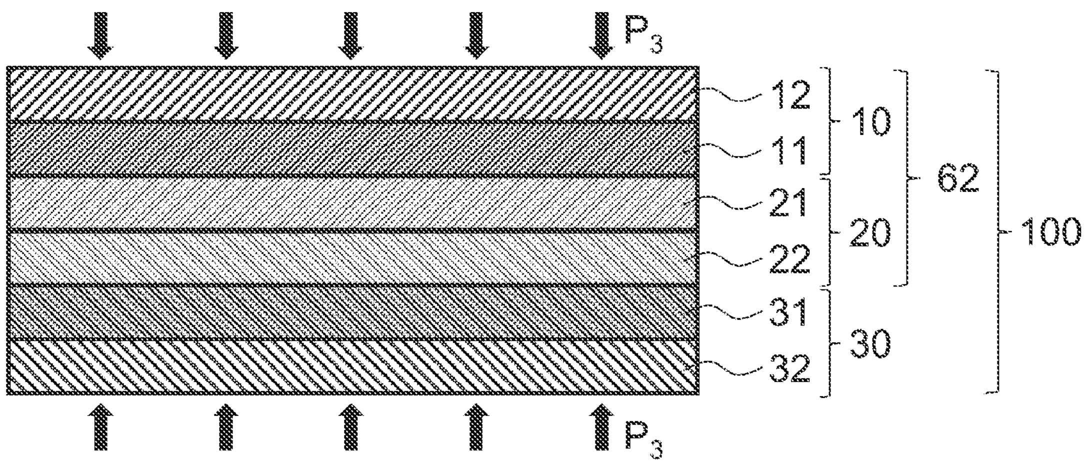
FIG. 3E is a schematic diagram illustrating a process for manufacturing a lithium sulfur battery.

As shown in FIG. 2, the area $A_{E1}$ of the surface of the first electrolyte layer 21 on the second electrolyte layer 22 side may be larger than the area $A_P$ of the surface of the positive electrode 10 on the first electrolyte layer 21 side. That is, in the case where the positive electrode 10 of the lithium sulfur battery 100 is disposed on the upper side and the negative electrode 30 is disposed on the lower side, when each layer is viewed from above, the outer edge of the first electrolyte layer 21 may be present outside the outer edge of the positive electrode 10. For example, the area $A_P/A_{E1}$ relative to the area $A_{E1}$ may be greater than or equal to 0.5, greater than or equal to 0.6, or greater than or equal to 0.7. The area $A_P/A_{E1}$ relative to the area $A_{E1}$ may be 1.0 or less, 1.0 or less, 0.9 or less, or 0.8 or less, relative to the area $A_P$. Further, as shown in FIG. 2, at least a part of the side surface of the positive electrode 10 may be covered with the first electrolyte layer 21. More specifically, at least a part of the side surface of the positive electrode 10 may be covered with the first electrolyte layer 21 so that at least the positive electrode active material layer 11 of the positive electrode 10 is embedded in the first electrolyte layer 21. As described above, since the area $A_{E1}$ of the first electrolyte layer 21 is larger than the area $A_P$ of the positive electrode and/or at least a part of the side surface of the positive electrode 10 is covered with the first electrolyte layer 21, it is considered that the stress from the positive electrode 10 can be more appropriately relaxed and absorbed by the first electrolyte layer 21.

1.2.2 Second Electrolyte Layer

The second electrolyte layer 22 is disposed between the first electrolyte layer 21 and the negative electrode 30. The second electrolyte layer 22 includes an electrolyte different from the above-described hydride solid electrolyte.

Examples of the electrolyte different from the hydride solid electrolyte include those exemplified as the electrolyte that can be included in the positive electrode active material layer 11 described above. In particular, when the second electrolyte layer 22 includes an inorganic solid electrolyte, among them, a sulfide solid electrolyte, higher performance is likely to be exhibited. When the sulfide solid electrolyte is contained in the second electrolyte layer 22, the sulfide solid electrolyte is more likely to exhibit higher performance when the sulfide solid electrolyte contains Li, P and S, and particularly when the sulfide solid electrolyte contains Li, P, S and halogen. As a sulfide solid electrolyte containing Li, P and Li, P, S and S, for example, $LiI—Li_2S—SiS_2$, $LiI—Si_2S—P_2S_5$, $Li_2S—P_2S_5—LiI—LiBr$, $LiI—Li_2S—P_2S_5$, $LiI—Li_2S—P_2O_5$, $LiI—Li_3PO_4—P_2S_5$, $Li_2S—P_2S_5—GeS_2$, etc. Among them, the performance of $Li_2S—P_2S_5—LiI—LiBr$ is higher. The content of the electrolyte different from the hydride solid electrolyte in the second electrolyte layer 22 is not particularly limited. The second electrolyte layer 22 may contain, for example, 50% to 100% by mass or less, 60% to 100% by mass or less, 70% to 100% by mass or less, 80% to 100% by mass or less, or 90% to 100% by mass or less.

The second electrolyte layer 22 may include a hydride solid electrolyte together with an electrolyte different from the hydride solid electrolyte. The proportion of the hydride solid electrolyte in the entire electrolyte included in the second electrolyte layer 22 may be low. For example, the proportion of the hydride solid electrolyte in the entire electrolyte contained in the second electrolyte layer 22 may be 0% by mass or more and 50% by mass or less, 0% by mass or more and 40% by mass or less, 0% by mass or more and 30% by mass or less, 0% by mass or more and 20% by mass or less, 0% by mass or more and 10% by mass or less, or 0% by mass or more and 5% by mass or less.

The binder that may be included in the second electrolyte layer 22 may be appropriately selected from those exemplified as the binder that may be included in the positive electrode active material layer 11 described above, for example. The binder included in the second electrolyte layer 22 and the binder included in the positive electrode active material layer 11 may be of the same type or may be of different types. The binder included in the second electrolyte layer 22 and the binder included in the first electrolyte layer 21 may be of the same type or may be of different types.

The shape of the second electrolyte layer 22 is not particularly limited as long as it can be disposed between the first electrolyte layer 21 and the negative electrode 30. The shape of the second electrolyte layer 22 may be, for example, a sheet-like second electrolyte layer 22 having a substantially flat surface. The thickness of the second electrolyte layer 22 is not particularly limited. The thickness of the second electrolyte layer 22 may be, for example, 0.1 μm or more, 1 μm or more, or 10 μm or more. The thickness of the second electrolyte layers 22 may be 2 mm or less, 1 mm or less, or 500 μm or less.

The area $A_{E1}$ of the surface of the first electrolyte layer 21 on the second electrolyte layer 22 side may be the same as or different from the area $A_{E2}$ of the surface of the second electrolyte layer 22 on the first electrolyte layer 21 side. That is, in a case where the positive electrode 10 of the lithium sulfur battery 100 is disposed on the upper side and the negative electrode 30 is disposed on the lower side, when each layer is viewed from above, the positions of the outer edge of the first electrolyte layer 21 and the positions of the outer edge of the second electrolyte layer 22 may or may not coincide with each other.

1.2.3 Other Electrolyte Layers

In FIGS. 1 and 2, only the first electrolyte layer 21 and the second electrolyte layer 22 are clearly shown as the electrolyte layer 20. The lithium sulfur battery 100 may further include an electrolyte layer (not shown). For example, the lithium sulfur battery 100 may have another electrolyte layer between the first electrolyte layer 21 and the second electrolyte layer 22. For example, the lithium sulfur battery 100 may have another electrolyte layer between the second electrolyte layer 22 and the negative electrode 30. The composition and thickness of the other electrolyte layers are not particularly limited. From the viewpoint of simplifying the battery configuration, the lithium sulfur battery 100 may include only the first electrolyte layer 21 and the second electrolyte layer 22 as the electrolyte layer 20. Specifically, the first electrolyte layer 21 may be disposed between the positive electrode 10 and the second electrolyte layer 22, and one surface of the first electrolyte layer 21 may be in contact with the positive electrode 10 and the other surface may be in contact with the second electrolyte layer 22. The second electrolyte layer 22 may be disposed between the first electrolyte layer 21 and the negative electrode 30, and one surface of the second electrolyte layer 22 may be in contact with the first electrolyte layer 21 and the other surface may be in contact with the negative electrode 30.

1.3 Negative Electrode

The negative electrode 30 may be any one that can appropriately function as a negative electrode of a lithium sulfur battery. The configuration is not particularly limited. As shown in FIG. 1, the negative electrode 30 may include a negative electrode active material layer 31 and a negative electrode current collector 32.

1.3.1 Negative Electrode Active Material Layer

The negative electrode active material layer 31 includes at least a negative electrode active material, and may optionally include an electrolyte, a conductive auxiliary agent, a binder, and the like. In addition, the negative electrode active material layer 31 may contain various additives. The content of each component in the negative electrode active material layer 31 may be appropriately determined according to the desired battery performance. For example, the content of the negative electrode active material may be 60% by mass or more, 70% by mass or more, 80% by mass or more, 90% by mass or more, or 100% by mass or less, with the entire negative electrode active material layer 31 (the entire solid content) being 100% by mass. The shape of the negative electrode active material layer 31 is not particularly limited. The shape of the negative electrode active material layer 31 may be, for example, a sheet-like negative electrode active material layer having a substantially flat surface. The thickness of the negative electrode active material layer 31 is not particularly limited. The thickness of the negative electrode active material layer 31 may be, for example, 0.1 μm or more, 1 μm or more, or 10 μm or more. The thickness of the negative electrode active material layers 31 may be 2 mm or less, 1 mm or less, or 500 μm or less.

As the negative electrode active material, for example, lithium is used. The lithium may be any lithium as long as it can function as a negative electrode active material. The lithium may be metallic lithium, a lithium alloy, or a lithium compound. The negative electrode active material layer 31 may contain a negative electrode active material other than lithium. Examples of the negative electrode active material other than lithium include Si active materials such as Si, a Si alloy, and a Si compound, and carbon-based active materials such as graphite. Note that the above-described problems of lithium growth through cracking of the electrolyte layer and short-circuiting due to lithium growth are particularly likely to occur when lithium is employed as the negative electrode active material. On the other hand, in the lithium sulfur battery 100, as described above, the first electrolyte layer 21 contains a predetermined hydride solid electrolyte, and cracking of the electrolyte layer is easily suppressed, and occurrence of a short circuit due to growth of lithium is easily suppressed. In this regard, in the lithium sulfur battery 100, the ratio of lithium to the entire negative electrode active material contained in the negative electrode active material layer 31 may be high. Specifically, the proportion of lithium in the total negative active material contained in the negative electrode active material layer 31 may be not less than 50% mass % or more than 100% mass %, not more than 60% mass % or more than 100% mass %, not more than 70% mass % or more than 100 mass % or less, not more than 80% mass % or more than 100 mass % or not, or not more than 90% mass % or not more than 100 mass %.

The shape of the negative electrode active material may be any general shape as the negative electrode active material of the lithium sulfur battery. The negative electrode active material may be, for example, a sheet or a particle. The negative electrode active material may include lithium deposition during charging, or may include lithium dissolution during discharging. In this case, the negative electrode active material layer 31 may be a layer made of metal lithium or a lithium alloy (for example, a metal lithium foil or a lithium alloy foil).

The electrolyte, the conductive auxiliary agent, and the binder that can be included in the negative electrode active material layer 31 can be appropriately selected and used from those exemplified as those that can be included in the positive electrode active material layer 11. The electrolyte, the conductive auxiliary agent, and the binder included in the negative electrode active material layer 31 and the electrolyte, the conductive auxiliary agent, and the binder included in the positive electrode active material layer 11 may be of the same type or may be of different types.

1.3.2 Negative Electrode Current Collector

As shown in FIG. 1, the negative electrode 30 may include a negative electrode current collector 32 in contact with the negative electrode active material layer 31. As the negative electrode current collector 32, any of common negative electrode current collectors of a lithium sulfur battery can be adopted. The negative electrode current collector 32 may be a foil, a plate, a mesh, a punching metal, a foam, or the like. The negative electrode current collector 32 may be formed of a metal foil or a metal mesh, or may be formed of a carbon sheet. In particular, the metal foil and the carbon sheet are excellent in handleability and the like. The negative electrode current collector 32 may be formed of a plurality of metal foils or carbon sheets. The negative electrode current collector 32 may be made of Cu, Ni, Cr, Au, Pt, Ag, Al, Fe, Ti, Zn, Co, steel or the like. In particular, the negative electrode current collector 32 may contain at least one metal selected from Cu, Ni and stainless steel, or may be made of a carbon sheet, from the viewpoint of ensuring reduction resistance and from the viewpoint of difficulty in alloying with lithium. The negative electrode current collector 32 may have some coating layer on the surface thereof for the purpose of adjusting resistance or the like. When the negative electrode current collector 32 is composed of a plurality of metal foils or a plurality of carbon sheets, the negative electrode current collector 32 may have some layer between the plurality of metal foils or the plurality of carbon sheets. The thickness of the negative electrode current collector 32 is not particularly limited. The thickness of the negative electrode current collector 32 may be, for example, 0.1 μm or more or 1 μm or more, and may be 1 mm or less or 100 μm or less.

1.4 Other Configurations

The lithium sulfur battery 100 may have at least the above-described configurations. The lithium sulfur battery 100 may have other configurations. The configuration described below is an example of other configurations that the lithium sulfur battery 100 may have.

1.4.1 Exterior Body

In the lithium sulfur battery 100, the above-described components may be accommodated in an exterior body. More specifically, a portion excluding a tab, a terminal, or the like for extracting electric power from the lithium sulfur battery 100 to the outside may be accommodated in the exterior body. As the exterior body, any known exterior body of a battery can be adopted. For example, a laminate film may be used as the exterior body. Further, a plurality of lithium sulfur batteries 100 may be electrically connected to each other, and may be arbitrarily superposed to form a battery pack. In this case, the assembled battery may be accommodated in a known battery case.

1.4.2 Sealing Resin

In the lithium sulfur battery 100, each of the above-described configurations may be sealed with a resin. For example, at least a side surface (a surface along the lamination direction) of the laminate composed of the respective layers may be sealed with a resin. As a result, it is easy to suppress the mixing of moisture and the like into the inside of each layer. As the sealing resin, a known thermosetting resin or thermoplastic resin can be employed.

1.4.3 Restraining Member

The lithium sulfur battery 100 may have a restraining member for restraining each layer in the stacking direction. Since the restraining pressure is applied to each layer by the restraining member in the stacking direction, the internal resistance of each layer is easily reduced. The constraining pressure may be, for example, less than or equal to 50 MPa, less than or equal to 30 MPa, or less than or equal to 10 MPa. The constraining pressure may also be greater than or equal to 0.1 MPa or greater than or equal to 1.0 MPa.

1.4.4 Battery Shape, Etc

The lithium sulfur battery 100 may have an obvious configuration such as a necessary terminal. The shape of the lithium sulfur battery 100 may include, for example, a coin cell, a laminate cell, a cylindrical shape, and a square shape. In particular, the performance of the laminate type is high.

2. Method for Producing Lithium Sulfur Battery

The lithium sulfur battery 100 can be manufactured as follows. That is, as shown in FIGS. 3A to E, a process for manufacturing the lithium sulfur battery 100 according to an embodiment includes:

Step S1: forming the first electrolyte layers 21 on the base material 41 to obtain the first transfer material 51;

Step S2: forming a second electrolyte layer 22 on the base material 42 to obtain a second transfer material 52;

Step S3: laminating the first transfer material 51 and the positive electrode 10, adding the pressure $P_1$ in the lamination direction, transferring the first electrolyte layer 21 to the surface of the positive electrode 10 to obtain a first laminate 61 of the positive electrode 10 and the first electrolyte layer 21, Step S4: laminating the second transfer material 52 and the first laminate 61, adding a pressure $P_2$ in the lamination direction, transferring the second electrolyte layer 22 to the surface of the first electrolyte layer 21 of the first laminate 61 to obtain a second laminate 62 of the positive electrode 10, the first electrolyte layer 21 and the second electrolyte layer 22; and Process S5: To obtain a lithium sulfur battery 100 having the positive electrode 10, the first electrolyte layer 21, the second electrolyte layer 22, and the negative electrode 30 in this order by laminating the second laminate 62 and the negative electrode 30 and then applying a pressure $P_3$ in the stacking direction.

It may include. Note that the process S2 may be performed prior to the process S1. Process S2 may be performed between process S1 and process S3. The process S2 may be performed after the process S3.

2.1 Process S1

As shown in 3A, in the process 51, the first electrolyte layers 21 are formed on the base material 41, and the first transfer material 51 is obtained.

The base material 41 may be any material that can be peeled off from the first electrolyte layers 21 after the pressure $P_1$ is applied in the process S3 described later. For example, a metal foil, a resin film, or the like may be employed as the base material 41.

The process of forming the first electrolyte layers 21 on the base material 41 in the process S1 is not particularly limited. For example, the first transfer material 51 may be obtained by applying a slurry containing a material constituting the first electrolyte layer 21 to the surface of the base material 41 and drying the slurry. Alternatively, the material constituting the first electrolyte layer 21 may be dry-molded together with the base material 41 to obtain the first transfer material 51.

2.2 Process S2

As shown in 3B, in the process S2, the second electrolyte layers 22 are formed on the base material 42, and the second transfer material 52 is obtained.

The base material 42 may be any material that can be peeled off from the second electrolyte layers 22 after the application of the pressure $P_2$ in the process S4 described later. For example, a metal foil, a resin film, or the like may be employed as the base material 42.

In the process S2, the process of forming the second electrolyte layers 22 on the base material 42 is not particularly limited. For example, the second transfer material 52 may be obtained by applying a slurry containing a material constituting the second electrolyte layer 22 to the surface of the base material 42 and drying the slurry. Alternatively, the second transfer material 52 may be obtained by dry-molding the material constituting the second electrolyte layer 22 together with the base material 42.

2.3 Process S3

As shown in 3C, in the process S3, the first transfer material 51 and the positive electrode 10 are stacked, and then the pressure $P_1$ is applied in the stacking direction, and the first electrolyte layer 21 is transferred to the positive electrode 10. Then, the first laminate 61 of the positive electrode 10 and the first electrolyte layer 21 is obtained.

As described above, the positive electrode 10 may include the positive electrode active material layer 11 and the positive electrode current collector 12. In this case, for example, the positive electrode 10 may be obtained by coating a slurry containing a material constituting the positive electrode active material layer 11 on the surface of the positive electrode current collector 12 and drying the slurry. Alternatively, the positive electrode 10 may be obtained by dry molding the material constituting the positive electrode active material layer 11 together with the positive electrode current collector 12.

In the process S3, for example, the first electrolyte layer 21 of the first transfer material 51 and the positive electrode active material layer 11 of the positive electrode 10 are stacked one on top of the other, and the pressure $P_1$ is applied in the stacking direction, so that the interface between the first electrolyte layer 21 and the positive electrode active material layer 11 is brought into close contact with each other. The pressure $P_1$ may be a pressure capable of plastically deforming the hydride solid-state electrolyte contained in the first electrolyte layers 21. Specifically, the pressure $P_1$ may be greater than or equal to 100 MPa, greater than or equal to 200 MPa, or greater than or equal to 300 MPa. The upper limit of the pressure $P_1$ is not particularly limited. The pressure $P_1$ may be any pressure as long as the layers are not damaged. The pressurizing process in the step S3 is not particularly limited. As a pressurizing method in the process S3, various pressurizing methods such as a CIP, HIP, roll press, a uniaxial press, and a mold press can be employed.

In step S3 and step S4 and S5 to be described later, "applying pressure in the lamination direction" means applying pressure in at least the lamination direction, and pressure in a direction other than the lamination direction may be included together with pressure in the lamination direction.

In the process S3, after the first transfer material 51 and the positive electrode 10 are laminated and pressurized as described above, the base material 41 is peeled off from the first transfer material 51 or the like, and the base material 41 is removed, whereby the first laminate 61 of the positive electrode 10 and the first electrolyte layers 21 can be obtained.

2.4 Process S4

As shown in 3D, in the process S4, the second transfer material 52 and the first laminate 61 are laminated, and then the pressure $P_2$ is applied in the lamination direction. The second electrolyte layer 22 is transferred to the surface of the first electrolyte layer 21 of the first laminate 61 to obtain the second laminate 62 of the positive electrode 10, the first electrolyte layer 21, and the second electrolyte layer 22.

In the process S4, for example, the second electrolyte layer 22 of the second transfer material 52 and the first electrolyte layer 21 of the first laminate 61 are superposed and stacked, and the pressure $P_2$ is applied in the stacking direction, so that the interface between the first electrolyte layer 21 and the second electrolyte layer 22 is brought into close contact with each other. The pressure $P_2$ may be a pressure capable of plastically deforming the electrolyte contained in the second electrolyte layers 22. Specifically, the pressure $P_2$ may be greater than or equal to 100 MPa, greater than or equal to 200 MPa, or greater than or equal to 300 MPa. The upper limit of the pressure $P_2$ is not particularly limited. The pressure $P_2$ may be a pressure that does not damage each layer. The pressurizing process in the step S4 is not particularly limited. As a pressurizing method in the process S4, various pressurizing methods such as a CIP, HIP, roll press, a uniaxial press, and a mold press can be employed.

In the process S4, after the second transfer material 52 and the first laminate 61 are laminated and pressurized as described above, the base material 42 is removed from the second transfer material 52 by peeling off the base material 42 or the like, whereby the second laminate 62 of the positive electrode 10, the first electrolyte layer 21, and the second electrolyte layer 22 can be obtained.

2.5 Process S5

As shown in 3E, in the process S5, after the second laminate 62 and the negative electrode 30 are stacked, the positive electrode 10, the first electrolyte layer 21, the second electrolyte layer 22, and the negative electrode 30 are stacked in this order by applying the pressure $P_3$ in the stacking direction. The lithium sulfur battery 100 is obtained.

As described above, the negative electrode 30 may include the negative electrode active material layer 31 and the negative electrode current collector 32. In this case, for example, the negative electrode 30 may be obtained by coating a slurry containing a material constituting the negative electrode active material layer 31 on the surface of the negative electrode current collector 32 and drying the slurry. Alternatively, the negative electrode 30 may be obtained by dry molding the material constituting the negative electrode active material layer 31 together with the negative electrode current collector 32. Alternatively, the negative electrode 30 may be obtained by attaching a metal lithium foil or a lithium alloy foil as the negative electrode active material layer 31 to the surface of the negative electrode current collector 32.

In the process S5, for example, the second electrolyte layer 22 of the second laminate 62 and the negative electrode active material layer 31 of the negative electrode 30 are superposed and stacked, and the pressure $P_3$ is applied in the stacking direction, so that the interface between the second electrolyte layer 22 and the negative electrode active material layer 31 is brought into close contact with each other. The pressure $P_3$ is not particularly limited. The pressure $P_3$ may be, for example, less than 100 MPa. The lower limit of the pressure $P_3$ is not particularly limited. The pressure $P_3$ may be a pressure to the extent that desired interfacial adhesion is obtained. The pressurizing process in the step S5 is not particularly limited. As a pressurizing method in the process S5, various pressurizing methods such as a CIP, HIP, roll press, a uniaxial press, and a mold press can be employed.

The lithium sulfur battery 100 manufactured as described above may be accommodated in an exterior body or the like after a terminal or the like is attached as necessary, for example.

3. Vehicle With Lithium Sulfur Battery

As described above, the lithium sulfur battery of the present disclosure has a high capacity. Such batteries can be suitably used, for example, in at least one type of vehicles selected from hybrid electric vehicle (HEV), plug-in hybrid electric vehicle (PHEV) and battery electric vehicle (BEV). That is, the technique of the present disclosure is a vehicle including a lithium sulfur battery, wherein the lithium sulfur battery includes a positive electrode, a first electrolyte layer, a second electrolyte layer, and a negative electrode, the first electrolyte layer is disposed between the positive electrode and the second electrolyte layer, and is in contact with the positive electrode, the second electrolyte layer is disposed between the first electrolyte layer and the negative electrode, the first electrolyte layer includes a hydride solid electrolyte, the hydride solid electrolyte includes a complex ion including Li ions and H, and the second electrolyte layer includes an electrolyte that differs from the hydride solid electrolyte.

Hereinafter, the technology of the present disclosure will be described in more detail with reference to examples. However, the technology of the present disclosure is not limited to the following examples.

1. Example 1

1.1 Preparation of Positive Electrode Composite Material

As a starting material constituting the positive electrode mixture, 1.05 g elemental sulfur (S), 0.852 g $P_2S_5$, and VGCF of 0.57 g were used, and the starting material was combined by mechanical milling. Specifically, the above starting material was weighed in a glove box having a dew point temperature of −70° C. or lower, and then kneaded in an agate mortar for 15 minutes. A pot (45 mL, $ZrO_2$) previously dried at 60° C. and a zirconia ball (φ4 mm, about 500 pieces in 96 g) were prepared, and the powder after kneading was put into a pot together with the zirconia ball, and mechanical milling was performed for 1 hour at a 500 rpm, mechanical milling was performed for 15 minutes, mechanical milling was performed for 1 hour at a reverse rotation, and mechanical milling was performed for 1 hour at a 500 rpm, and stopping for 15 minutes was repeated for 48 hours, thereby obtaining a positive electrode mixture.

1.2 Preparation of Positive Electrode

A mesitylene solution containing 5% by weight of SBR and mesitylene were charged into a polypropylene container and mixed in a shaker for 3 minutes. Here, the positive electrode mixture ($S_8$—$P_2S_5$/C) was charged, and then mixed with a shaker for 3 minutes and mixed with an ultrasonic dispersing device for 30 seconds were repeated two times each. Subsequently, the positive electrode mixture slurry obtained immediately after mixing for 5 seconds in an ultrasonic dispersing device was coated on a Al foil as a positive electrode current collector using a doctor blade having a coating gap of 350 μm. After it was visually confirmed that the surface of the coated positive electrode mixture was dried, the coated positive electrode mixture was further dried on a hot plate at 100° C. for 30 minutes to obtain a positive electrode having a positive electrode active material layer and a positive electrode current collector. The obtained positive electrode was punched out on the φ11.28 mm and used.

1.3 Preparation of First Transfer Material

A heptane solution containing 5% by weight of ABR, heptane, and butyl butyrate were charged into a polypropylene container and mixed in a shaker for 3 minutes. Here, the hydride solid-electrolyte ($[LiCB_9H_{10}]_{0.7}[LiCB_{11}H_{12}]_{0.3}$, D50=2 μm) was charged, and then mixed with a shaker for 3 minutes and mixed with an ultrasonic dispersing device for 30 seconds, respectively, were repeated twice. Subsequently, the first electrolyte slurry obtained immediately after 5 seconds mixing in the ultrasonic disperser was coated on Al foil as a substrate using an applicator having a coating gap of 500 μm. After it was visually confirmed that the surface of the coated electrolyte was dried, the coated electrolyte was further dried on a hot plate at 165° C. for 30 minutes to obtain a first transfer material comprising a substrate and a first electrolyte layer. The content of ABR contained in the first electrolyte layer was 10 wt %. The obtained first transfer material was punched out to φ13 mm and used.

1.4 Preparation of Second Transfer Material

A heptane solution containing 5% by weight of ABR, heptane, and butyl butyrate were charged into a polypropylene container and mixed in a shaker for 3 minutes. Here, a sulfide solid electrolyte ($Li_2S$—$P_2S_5$—LiI—LiBr solid electrolyte, D50=0.5 μm) was charged, mixed with a shaker for 3 minutes, and mixed with an ultrasonic dispersing device for 30 seconds, respectively, were repeated twice. Subsequently, the second electrolyte slurry obtained immediately after 5 seconds mixing in the ultrasonic disperser was coated on Al foil as a substrate using an applicator having a coating gap of 350 μm. After the surface of the coated electrolyte was visually confirmed to have dried, the coated electrolyte was further dried on a hot plate at 165° C. for 30 minutes to obtain a second transfer material comprising a substrate and a second electrolyte layer. The content of ABR contained in the second electrolyte layer was 10 wt %. The obtained second transfer material was punched out to φ13 mm and used.

1.5 Preparation of the Negative Electrode

A negative electrode was produced by attaching a metal lithium foil (thickness: 70 μm) to the surface of a carbon sheet serving as a negative electrode current collector. The obtained negative electrode was punched out to φ13 mm and used.

1.6 Fabrication of Lithium Sulfur Batteries

When the positive electrode and the first transfer material were superposed on each other and pressed under 392 MPa pressure and then the base material was peeled off, the first electrolyte layer was transferred onto the positive electrode active material layer, and a first laminate of the positive electrode and the first electrolyte layer was obtained.

Next, the first laminate and the second transfer material were superposed on each other, pressed under 392 MPa pressure, and then the base material was peeled off, whereby the second electrolyte layer was transferred onto the first electrolyte layer of the first laminate, and a second laminate of the positive electrode, the first electrolyte layer, and the second electrolyte layer was obtained.

Next, the second laminate and the negative electrode were superimposed and temporarily pressed, and then further pressed by cold isotropic pressing (CIP) at a 98 MPa pressure to obtain a lithium sulfur battery having a positive electrode, a first electrolyte layer, a second electrolyte layer, and a negative electrode in this order. The resulting cells were encapsulated in laminates and then constrained by 10 MPa.

2. Example 2

A lithium sulfur battery was produced in the same manner as in Example 1, except that a positive electrode punched out to φ13 mm was used.

3. Comparative Example 1

A lithium sulfur battery was fabricated in the same manner as in Example 2, except that the second transfer material was used instead of the first transfer material (that is, a lithium sulfur battery having a positive electrode, a second electrolyte layer, a second electrolyte layer, and a negative electrode in this order was fabricated).

4. Comparative Example 2

A lithium sulfur battery was fabricated in the same manner as in Example 2, except that the first transfer material and the second transfer material were replaced (that is, a lithium sulfur battery having a positive electrode, a second electrolyte layer, a first electrolyte layer, and a negative electrode in this order was fabricated).

5. Comparative Example 3

A lithium sulfur battery was fabricated in the same manner as in Example 2, except that the first transfer material was used instead of the second transfer material (that is, a lithium sulfur battery having a positive electrode, a first electrolyte layer, a first electrolyte layer, and a negative electrode in this order was fabricated).

6. Electrochemical Measurement

Each of the batteries according to Examples and Comparative Examples was soaked in a thermostatic bath at 60° C. for 3 hours, and then discharged and charged at a current density corresponding to a current 0.46 mA (0.05 C) in the capacity steps described below. Between each step, a 10 minute pause was assumed. The cut-off voltage was 1.5-3.1V. For each of the batteries according to the Examples and Comparative Examples, the maximum charge capacity obtained until the short circuit was reached was measured. From the largest charge capacity, the "battery capacity" per positive electrode mixture 1 g was identified.

Step 1: To 0.1 mAh, Step 2: 0.5 mAh, Step 3: 1.0 mAh, Step 4: 2.0 mAh, Step 5: 3.0 mAh, Step 6: 3.5 mAh, Step 7: 4.0 mAh, Step 8: 5.0 mAh, Step 9: 6.0 mAh, Step 7.0 mAh, Step 11: 8.0 mAh

7. Evaluation Results

Table 1 below shows the area ratio between the positive electrode and the electrolyte layer, the structure of the electrolyte layer, and the battery capacity for each of the Examples and Comparative Examples.

TABLE 1

| | Area ratio (positive electrode/ electrolyte layer) | Structure of the electrolyte layer | | Battery capacity [mAh/g (mixture)] |
|---|---|---|---|---|
| | | Positive electrode face | Negative electrode side | |
| Example 1 | 75% | First electrolyte layer (hydride) | Second electrolyte layer (Sulfide) | 768.1 |
| Example 2 | 100% | First electrolyte layer (hydride) | Second electrolyte layer (Sulfide) | 780.7 |
| Comparative Example 1 | 100% | Second electrolyte layer (Sulfide) | Second electrolyte layer (Sulfide) | 235.3 |
| Comparative Example 2 | 100% | Second electrolyte layer (Sulfide) | First electrolyte layer (hydride) | 315.3 |
| Comparative Example 3 | 100% | First electrolyte layer (hydride) | First electrolyte layer (hydride) | 450.5 |

From the results shown in Table 1, the following can be seen.

(1) When only the sulfide solid electrolyte layer is employed as the electrolyte layer (Comparative Example 1), the charge capacity obtained up to the short circuit is small. It is considered that, during discharging, the entire electrolyte layer is cracked due to the expansion of sulfur as the positive electrode active material, and lithium grows through the crack during charging, resulting in a short circuit with a low capacity.

(2) When the sulfide solid electrolyte layer and the hydride solid electrolyte layer are combined as the electrolyte layer and the sulfide solid electrolyte layer is disposed on the positive electrode side and the hydride solid electrolyte layer is disposed on the negative electrode side (Comparative Example 2), the charge capacity obtained up to the short circuit is slightly improved as compared with Comparative Example 1. In Comparative Example 2, it is considered that a crack occurred in the sulfide solid electrolyte layer due to the expansion of sulfur as the positive electrode active material during discharge, and a part of the crack propagated to the hydride solid electrolyte layer. That is, there is a possibility that the amount of cracking is slightly smaller than that in Comparative Example 1. As a result, it is considered that the capacity up to the short circuit is slightly increased.

(3) When only the hydride solid electrolyte layer is employed as the electrolyte layer (Comparative Example 3), the charge capacity obtained up to the short circuit is further improved as compared with Comparative Examples 1 and 2. In Comparative Example 3, it is considered that, even when the sulfur as the positive electrode active material expands and stress is generated in the electrolyte layer at the time of discharge, the stress is absorbed by the flexible hydride solid electrolyte layer, and cracking hardly occurs. As a result, it is considered that the capacity up to the short circuit has been increased. However, since the hydride solid electrolyte layer has lower performance such as ion conductivity than that of the sulfide solid electrolyte, it is difficult to obtain a sufficient battery capacity.

(4) When the sulfide solid electrolyte layer and the hydride solid electrolyte layer are combined as the electrolyte layer and the hydride solid electrolyte layer is disposed on the positive electrode side and the sulfide solid electrolyte layer is disposed on the negative electrode side (Examples 1 and 2), the charge capacity obtained up to the short circuit is further improved as compared with Comparative Example 3. In Examples 1 and 2, it is considered that, even if a stress is generated in the electrolyte layer due to expansion of sulfur as a positive electrode active material during discharge, the stress is absorbed by the flexible hydride solid electrolyte layer, and cracking is unlikely to occur. As a result, it is considered that the capacity up to the short circuit is increased. Further, it is considered that the battery capacity is further increased by disposing a sulfide solid electrolyte having excellent performance such as ion conductivity on the negative electrode side.

In the above example, a case has been exemplified in which only a specific hydride solid electrolyte is used as the electrolyte in the first electrolyte layer and only a specific sulfide solid electrolyte is used as the electrolyte in the second electrolyte layer. However, the technology of the present disclosure is not limited to this form. For example, even when an electrolyte other than a hydride solid electrolyte or a sulfide solid electrolyte is employed in the second electrolyte layer, a high effect of the technology of the present disclosure can be expected. Further, some electrolyte may be included in the first electrolyte layer and the second electrolyte layer.

Further, in the above example, the case where only elemental sulfur is used as the positive electrode active material and only metallic lithium is used as the negative electrode active material has been exemplified. However, the technology of the present disclosure is not limited to this form. Even in the case of a sulfur-based positive electrode active material other than elemental sulfur, since the volume change is accompanied during charging and discharging, the same problems as those of elemental sulfur occur, and the problems can be solved by the technology of the present disclosure. The negative electrode active material may be any material that can supply lithium to the sulfur-based positive electrode active material during discharge. That is, the technology of the present disclosure is considered to be widely applicable to a lithium sulfur battery in which a sulfur-based active material is employed as a positive electrode active material and lithium ions are employed as carrier ions.

As described above, according to the lithium sulfur battery having the following configuration, it is possible to increase the charge capacity up to the short circuit. That is, it can be said that the lithium sulfur battery having the following configuration has a high charge and discharge capacity.

(1) The lithium sulfur battery includes a positive electrode, a first electrolyte layer, a second electrolyte layer, and a negative electrode.

(2) The first electrolyte layer is disposed between the positive electrode and the second electrolyte layer and is in contact with the positive electrode.

(3) The second electrolyte layer is disposed between the first electrolyte layer and the negative electrode.

(4) The first electrolyte layer includes a hydride solid electrolyte. The hydride solid-electrolyte includes Li ions and complex ions containing H.

(5) The second electrolyte layer includes an electrolyte different from the hydride solid electrolyte.

What is claimed is:

1. A lithium sulfur battery comprising:
a positive electrode;
a first electrolyte layer including a hydride solid-electrolyte including a Li ion and a complex ion containing H;
a second electrolyte layer including an electrolyte different from the hydride solid-electrolyte; and
a negative electrode, wherein
the first electrolyte layer is disposed between the positive electrode and the second electrolyte layer, and is in contact with the positive electrode,
the second electrolyte layer is disposed between the first electrolyte layer and the negative electrode, and wherein
the complex ion contains H, B, and C.

2. The lithium sulfur battery according to claim 1, wherein an area of a surface of the first electrolyte layer on the second electrolyte layer side is larger than an area of a surface of the positive electrode on the first electrolyte layer side.

3. The lithium sulfur battery according to claim 2, wherein at least a portion of a side surface of the positive electrode is covered with the first electrolyte layer.

4. The lithium sulfur battery according to claim 1, wherein the second electrolyte layer includes a sulfide-solid electrolyte.

5. The lithium sulfur battery according to claim 4, wherein the sulfide-solid electrolyte contains Li, P, S, and halogen.

6. A lithium sulfur battery comprising:

a positive electrode;

a first electrolyte layer including a hydride solid-electrolyte including a Li ion and a complex ion containing H;

a second electrolyte layer including an electrolyte different from the hydride solid-electrolyte; and a negative electrode, wherein the first electrolyte layer is disposed between the positive electrode and the second electrolyte layer, and is in contact with the positive electrode, wherein the second electrolyte layer is disposed between the first electrolyte layer and the negative electrode, and wherein the second electrolyte layer includes a sulfide-solid electrolyte.

7. A lithium sulfur battery according to claim 6, wherein the sulfide-solid electrolyte contains Li, P, S, and halogen.

* * * * *